US 11,607,624 B2

United States Patent
Takada et al.

(10) Patent No.: US 11,607,624 B2
(45) Date of Patent: Mar. 21, 2023

(54) METHOD FOR PURIFYING NONAQUEOUS LIQUID SUBSTANCE AND ION EXCHANGE RESIN-FILLED CARTRIDGE WITH EXTERNAL AIR BLOCKING MEMBER

(71) Applicant: ORGANO CORPORATION, Tokyo (JP)

(72) Inventors: Noriko Takada, Tokyo (JP); Miwa Ito, Tokyo (JP)

(73) Assignee: ORGANO CORPORATION, Tokyo (JP)

( * ) Notice: Subject to any disclaimer, the term of this patent is extended or adjusted under 35 U.S.C. 154(b) by 238 days.

(21) Appl. No.: 16/769,477

(22) PCT Filed: Aug. 24, 2018

(86) PCT No.: PCT/JP2018/031301
§ 371 (c)(1),
(2) Date: Jun. 3, 2020

(87) PCT Pub. No.: WO2019/123718
PCT Pub. Date: Jun. 27, 2019

(65) Prior Publication Data
US 2020/0384383 A1 Dec. 10, 2020

(30) Foreign Application Priority Data
Dec. 21, 2017 (JP) .............................. JP2017-244686

(51) Int. Cl.
*B01D 15/20* (2006.01)
*B01D 15/36* (2006.01)
(Continued)

(52) U.S. Cl.
CPC ......... *B01D 15/203* (2013.01); *B01D 15/361* (2013.01); *B01J 39/04* (2013.01);
(Continued)

(58) Field of Classification Search
CPC .... B01D 15/203; B01D 15/206; B01D 15/22; B01D 15/265; B01D 15/361;
(Continued)

(56) References Cited

U.S. PATENT DOCUMENTS

| 4,731,438 A * | 3/1988 | Bernier .................... C08F 6/02 528/499 |
| 5,350,714 A | 9/1994 | Trefonas, III et al. |
| 5,518,628 A | 5/1996 | Carey |

FOREIGN PATENT DOCUMENTS

| CN | 101973859 A | 2/2011 |
| CN | 105143104 A | 12/2015 |

(Continued)

OTHER PUBLICATIONS

English machine translation of Ishikawa JP2004181352; Jul. 2, 2004; 13 pages. (Year: 2004).*
(Continued)

*Primary Examiner* — Magali P Slawski
*Assistant Examiner* — Robin S Gray
(74) *Attorney, Agent, or Firm* — Greenblum & Bernstein, P.L.C.

(57) ABSTRACT

A method for purifying a nonaqueous liquid substance includes: filling a cartridge container with a macroporous or porous type ion exchange resin in a water-wet state to obtain an ion exchange resin-filled cartridge filled with the macroporous or porous type ion exchange resin before water content reduction; reducing a water content of the macroporous or porous type ion exchange resin in the cartridge container until a water content (A) of the macroporous or porous type ion exchange resin after water content reduction becomes 90 to 97% of a water content (B) of the macroporous or porous type ion exchange resin in a saturated equilibrium state; an initial blowing step of allowing the nonaqueous liquid substance before being purified to pass
(Continued)

inside the cartridge container filled with the macroporous or porous type ion exchange resin after water content reduction and discharging an initial blow effluent from inside the cartridge container; and purification.

6 Claims, 10 Drawing Sheets

(51) Int. Cl.
  *B01J 39/04* (2017.01)
  *B01J 41/04* (2017.01)
  *B01J 47/024* (2017.01)
  *B01J 47/04* (2006.01)
  *B01J 47/06* (2006.01)
  *B01J 47/14* (2017.01)

(52) U.S. Cl.
  CPC .............. *B01J 41/04* (2013.01); *B01J 47/024* (2013.01); *B01J 47/04* (2013.01); *B01J 47/06* (2013.01); *B01J 47/14* (2013.01); *B01D 2257/60* (2013.01)

(58) Field of Classification Search
  CPC .. B01D 15/362; B01D 15/363; B01D 15/364; B01D 2257/60; B01J 39/04; B01J 39/00; B01J 4/10; B01J 41/04; B01J 47/024; B01J 47/06; B01J 47/14; B01J 47/02; B01J 20/30; B01J 20/0392
  See application file for complete search history.

(56) References Cited

FOREIGN PATENT DOCUMENTS

| | | |
|---|---|---|
| CN | 106699522 A | 5/2017 |
| JP | 7-232089 | 9/1995 |
| JP | 8-53162 | 2/1996 |
| JP | 2002-104539 | 4/2002 |
| JP | 2004-181351 | 7/2004 |
| JP | 2004-181352 | 7/2004 |
| JP | 2004-249238 | 9/2004 |
| JP | 5758558 | 8/2015 |
| JP | 2015-188829 | 11/2015 |
| WO | WO-03002500 A1 * | 1/2003 .............. C07B 49/00 |
| WO | WO-2017116755 A1 * | 7/2017 ........... B01D 15/362 |

OTHER PUBLICATIONS

Product Data Sheet Diaion RCP145H, 2 pages, No. 01-02-A-6340; 2021. (Year: 2021).*

English machine translation of JP2019111463A, Ito et al., Nov. 7, 2019, 56 pages. (Year: 2019).*

Office Action issued in the corresponding Chinese Patent Application No. 201880057576.8 dated May 25, 2022; Applicant requests consideration of the Office Action's indication of category of references, e.g., "X", "Y", "A", etc.; 8 pages.

Office Action issued in corresponding Taiwanese Patent Application No. 107132741 dated Aug. 23, 2021, along with English translation thereof ; 6 pages.

* cited by examiner

[Fig. 1]
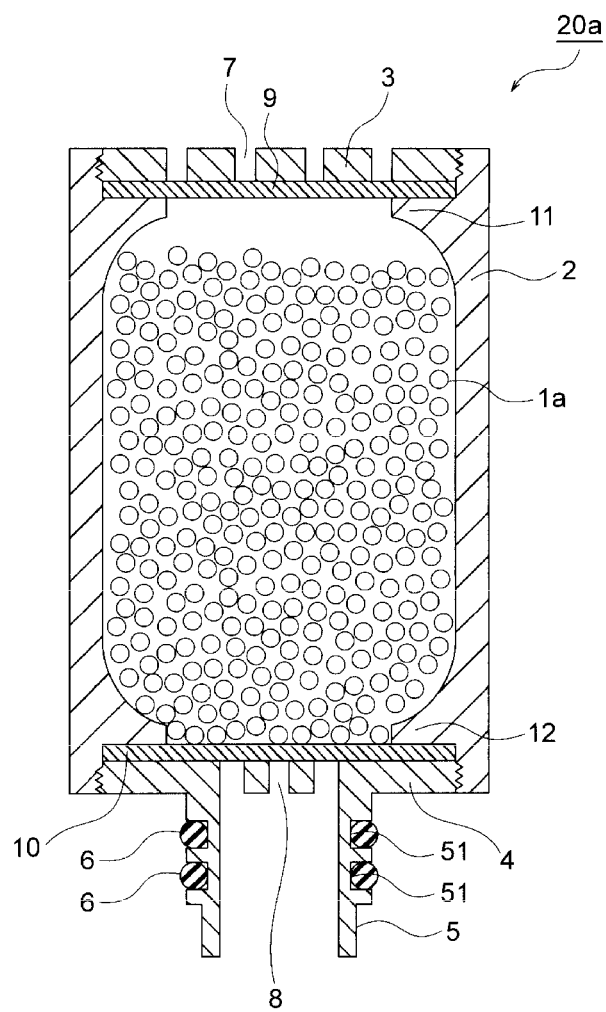

[Fig. 2]
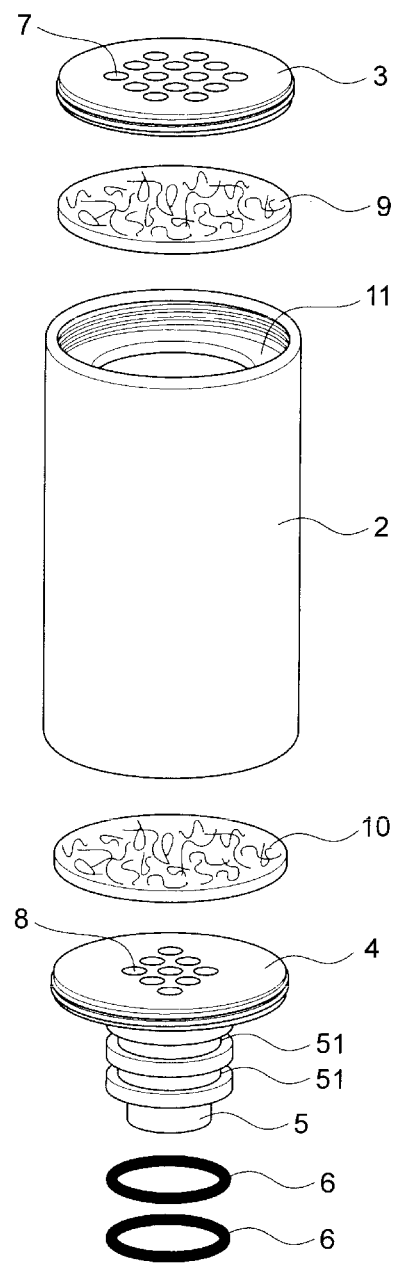

[Fig. 3]
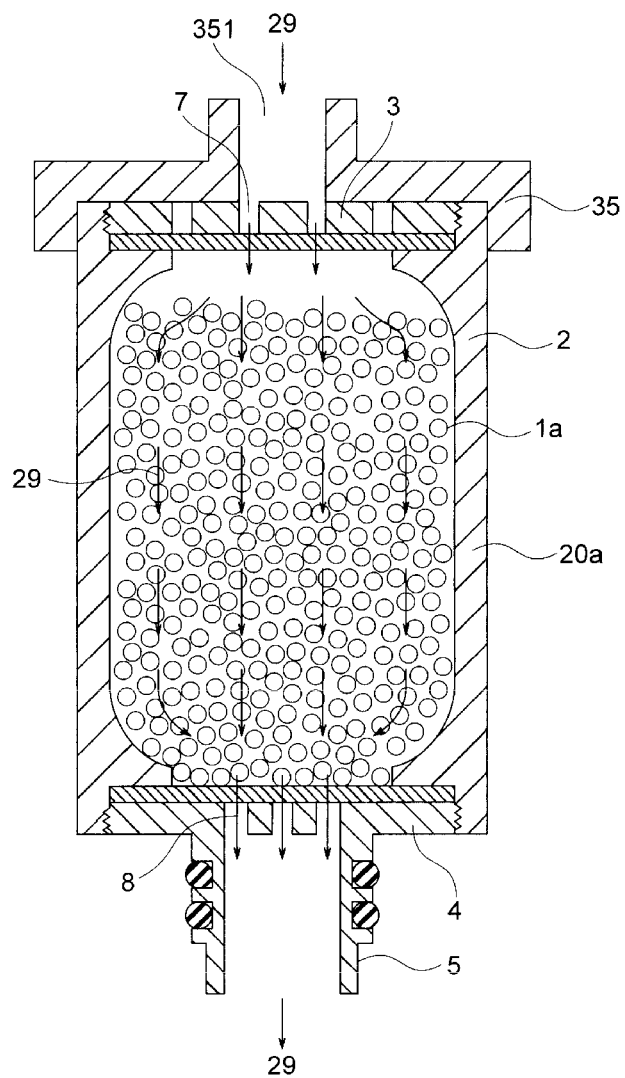

[Fig. 4]
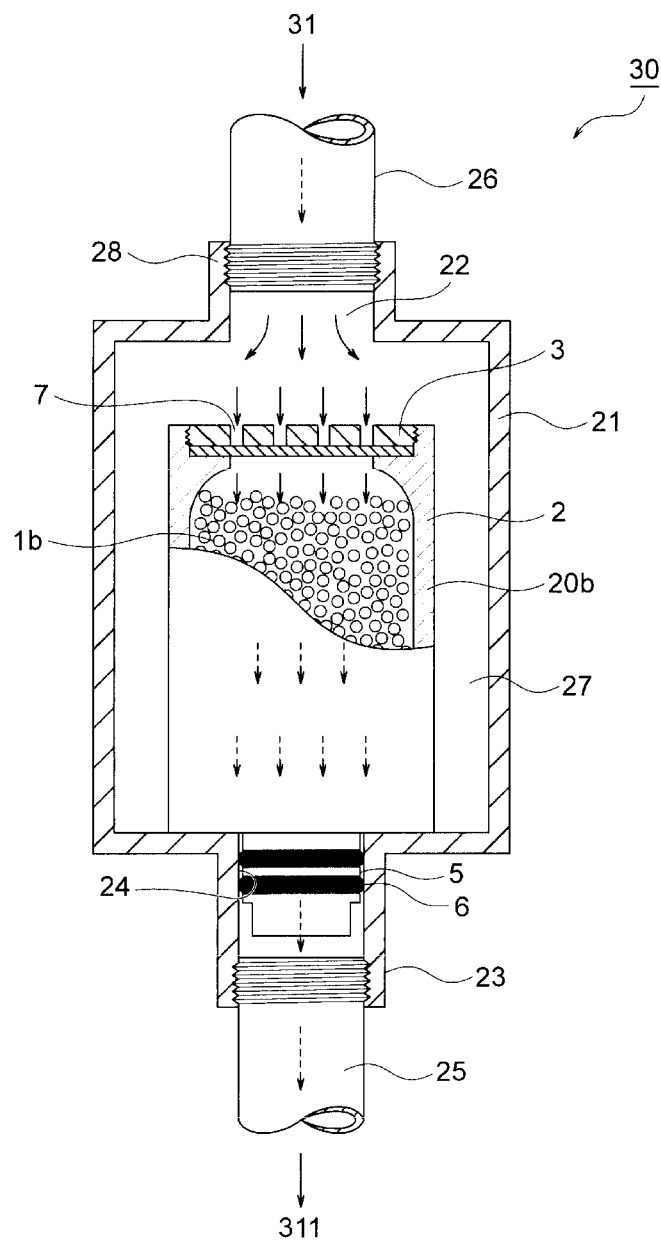

[Fig. 5]
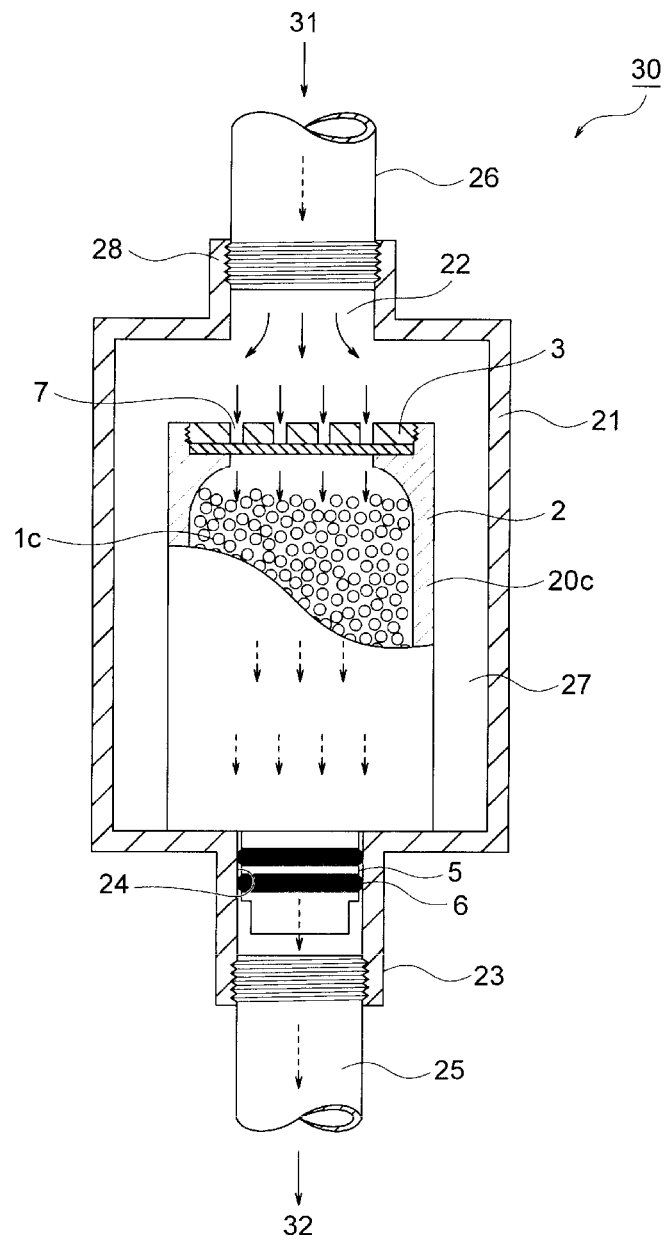

[Fig. 6]
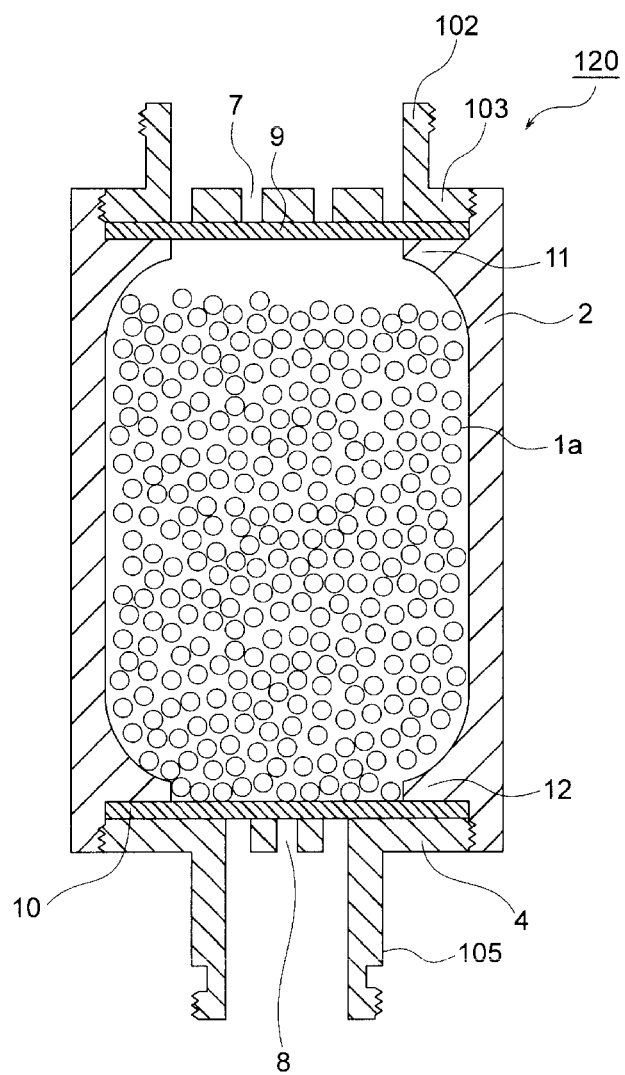

[Fig. 7]
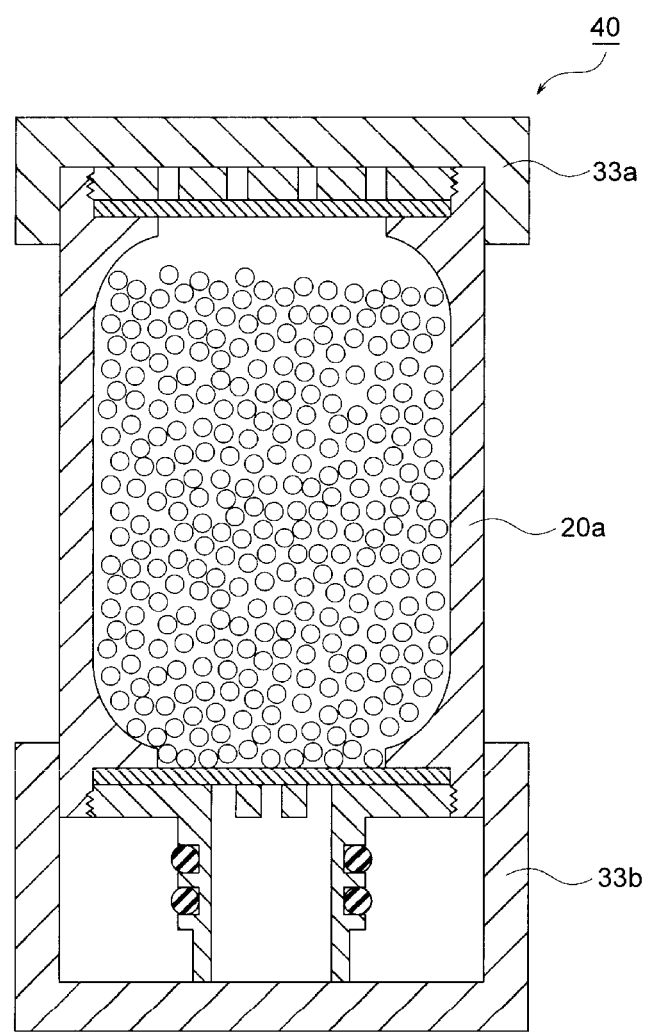

[Fig. 8]
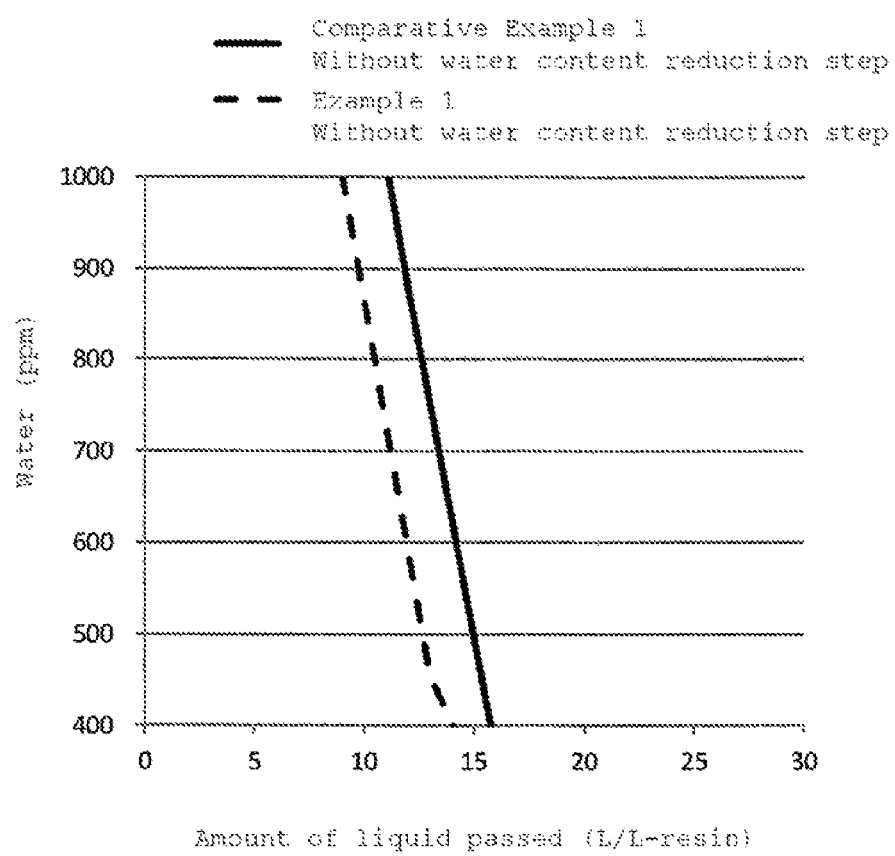

[Fig. 9]
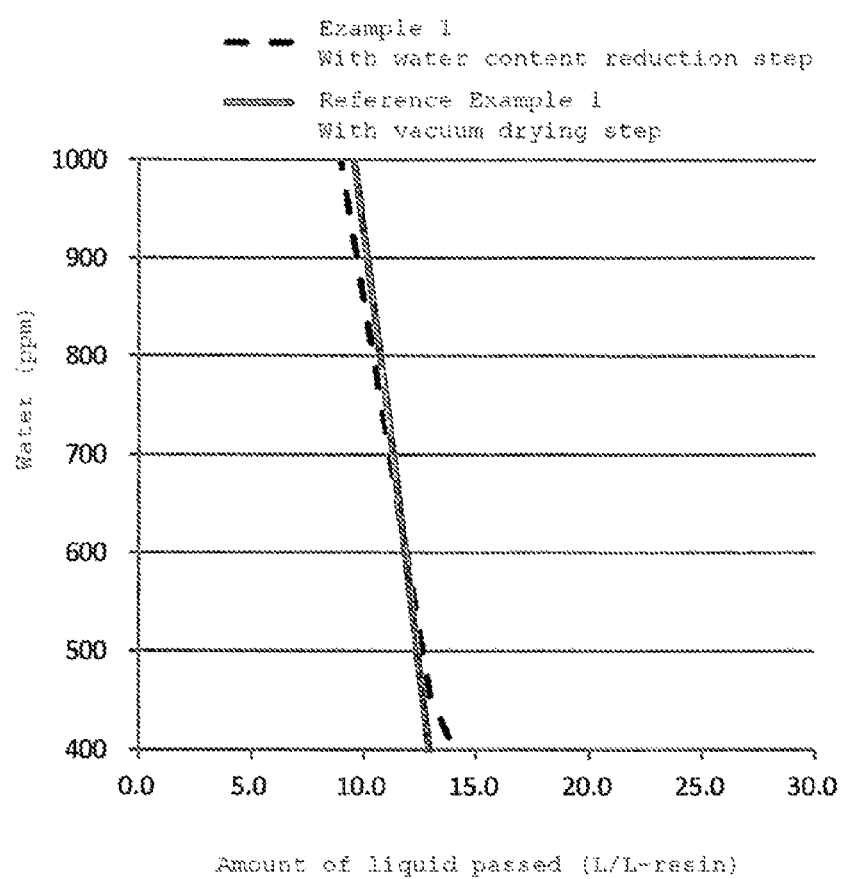

[Fig. 10]
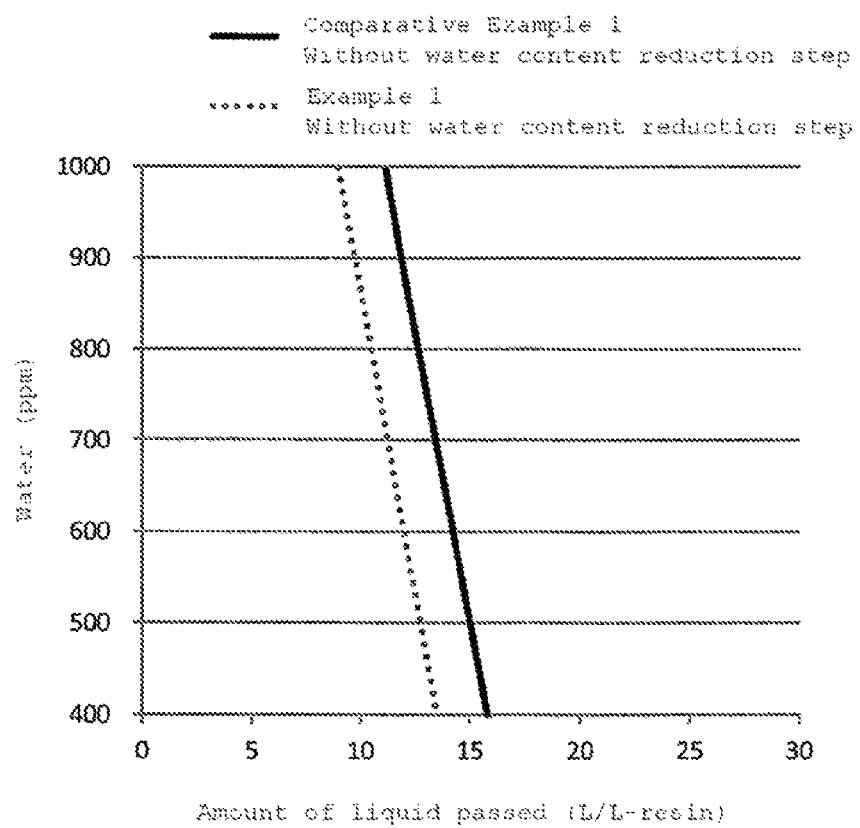

METHOD FOR PURIFYING NONAQUEOUS LIQUID SUBSTANCE AND ION EXCHANGE RESIN-FILLED CARTRIDGE WITH EXTERNAL AIR BLOCKING MEMBER

TECHNICAL FIELD

The present invention relates to a method for purifying a nonaqueous liquid substance for removing impurities in a nonaqueous liquid substance and to an ion exchange resin-filled cartridge used for the same.

BACKGROUND ART

As techniques for removing trace metals in a nonaqueous liquid substance, a purification method for obtaining a purified nonaqueous liquid substance by filling a cartridge or a column with an ion exchange resin and allowing a nonaqueous liquid, which is a liquid to be treated, to directly pass inside the cartridge or the column (purification method 1) and a purification method for obtaining a purified nonaqueous liquid substance by filling a cartridge with an ion exchange resin, further providing a housing container covering the cartridge, and allowing a nonaqueous liquid substance, which is a liquid to be treated, to pass between the cartridge and the housing container and then pass inside the cartridge (purification method 2) are known.

As an example of purification method 1, Patent Literature 1 has reported a purification method for removing metal ions and the like by bringing a nonaqueous liquid substance into contact with a cation exchange resin having a water content of 3 to 30%. Patent Literature 2 has reported a purification method for removing metal ions and the like by bringing a nonaqueous liquid substance into contact with a cation exchange resin having a water content of less than 3% and an anion exchange resin having a water content of 30% or less. Patent Literature 3 has reported a method for purifying a nonaqueous liquid substance by reducing the water content of a strongly acidic cation exchange resin to 5% or less, filling a column with an ion exchange resin for drying, and allowing a nonaqueous liquid substance to pass therethrough.

As an example of purification method 2, Patent Literature 4 has reported a purifier including an ion exchange resin container for filling the inside of a cylindrical housing with an ion exchange resin as a purifier for removing chromium from an organic solvent and a method of using the same.

Then, the inside of an ion exchange resin-filled cartridge before being used is usually filled with an ion exchange resin in a water-wet state.

Meanwhile, a nonaqueous liquid substance to be purified by an ion exchange resin-filled cartridge is required to be highly purified by reducing its impurity concentration. Therefore, an extremely low water content is required since water also constitutes impurities in a nonaqueous liquid substance similar to metal ions.

For example, in a case where a nonaqueous liquid substance having a water concentration of a few hundred ppm or less is purified, even when a dried ion exchange resin is used, pores within the ion exchange resin swell in the nonaqueous liquid substance and water molecules remaining within the pores are eluted thereby, or water molecules forming hydrate with an ion exchange group are eluted through ion exchange. Consequently, a water concentration in a treated liquid is increased compared to that in a liquid to be treated. Therefore, for purification of a nonaqueous liquid substance using an unused ion exchange resin-filled cartridge, an initial blowing step in which the nonaqueous liquid substance is allowed to pass inside the cartridge and brought into contact with the ion exchange resin filling the inside of the cartridge to remove water in the ion exchange resin is required before performing purification.

As a method for reducing the water content of an ion exchange resin, heat drying and vacuum drying, which have been reported in Patent Literature 3, are used, for example. However, conventional heat drying and vacuum drying cause impurities to be mixed into an ion exchange resin due to contact with a metal and contact with the air containing metals or fine particles during a drying step and a step of transferring the ion exchange resin in a dried state to a cartridge or a column.

CITATION LIST

Patent Literature

[Patent Literature 1] Japanese Patent Laid-Open No. 2004-181351
[Patent Literature 2] Japanese Patent Laid-Open No. 2004-181352
[Patent Literature 3] Japanese Patent Laid-Open No. 2004-249238
[Patent Literature 4] Japanese Patent No. 5758558

SUMMARY OF INVENTION

Technical Problem

However, although the initial blowing should be continued until water in the ion exchange resin is removed to an extent that an influence of water on a treated nonaqueous liquid substance is eliminated, conventional purification methods have had such a problem that the amount of a nonaqueous liquid substance wasted by initial blowing increases.

Accordingly, an object of the present invention is to provide a method for purifying a nonaqueous liquid substance wherein a nonaqueous liquid substance is brought into contact with an ion exchange resin to remove impurities from the nonaqueous liquid substance, the method being capable of reducing an amount of the nonaqueous liquid substance used for initial blowing and preventing the ion exchange resin in an ion exchange resin-filled cartridge from being contaminated.

Solution to Problem

The above problem is solved by the following present invention.

That is, Present Invention (1) provides a method for purifying a nonaqueous liquid substance wherein a nonaqueous liquid substance is brought into contact with a macroporous type or porous type ion exchange resin to remove impurities from the nonaqueous liquid substance, the method including:

an ion exchange resin filling step of filling a cartridge container with the macroporous type or porous type ion exchange resin in a water-wet state to obtain an ion exchange resin-filled cartridge filled with the macroporous type or porous type ion exchange resin before water content reduction;

a water content reduction step of reducing a water content of the macroporous type or porous type ion exchange resin in the cartridge container until a water content (A) of the macroporous type or porous type ion exchange resin after water content reduction becomes 90.0 to 97.0% of a water content (B) of the macroporous type or porous type ion exchange resin in a saturated equilibrium state;

an initial blowing step of allowing the nonaqueous liquid substance before being purified to pass inside the cartridge container filled with the macroporous type or porous type ion exchange resin after water content reduction and discharging an initial blow effluent from an inside of the cartridge container; and a purification step of performing purification of the nonaqueous liquid substance by allowing the nonaqueous liquid substance before being purified to pass inside the cartridge container and thereby bringing the nonaqueous liquid substance before being purified into contact with the macroporous type or porous type ion exchange resin in the cartridge container to obtain the nonaqueous liquid substance after being purified.

In addition, Present Invention (2) provides the method for purifying a nonaqueous liquid substance of the above (1), wherein the water content reduction step is performed by allowing an inert gas to pass inside the cartridge container to bring the inert gas into contact with the macroporous type or porous type ion exchange resin in the cartridge container.

In addition, Present Invention (3) provides the method for purifying a nonaqueous liquid substance of the above (2), wherein a temperature of the inert gas is 0 to 60° C.

In addition, Present Invention (4) provides the method for purifying a nonaqueous liquid substance of the above (1), wherein the water content reduction step is performed by reducing a pressure within the cartridge container filled with the macroporous type or porous type ion exchange resin to vacuum drying the macroporous type or porous type ion exchange resin.

In addition, Present Invention (5) provides the method for purifying a nonaqueous liquid substance of the above (4), wherein a temperature at the vacuum drying is 0 to 60° C.

In addition, Present Invention (6) provides the method for purifying a nonaqueous liquid substance of the above (1), wherein the water content reduction step is performed by heating the ion exchange resin-filled cartridge filled with the macroporous type or porous type ion exchange resin in a heating device under an inert gas atmosphere.

In addition, Present Invention (7) provides an ion exchange resin-filled cartridge with an external air blocking member, including:

an ion exchange resin-filled cartridge having
a cartridge container,
a supply port for supplying a nonaqueous liquid substance to an inside of the cartridge container,
a discharge port for discharging the nonaqueous liquid substance from the inside of the cartridge container, and
a macroporous type or porous type ion exchange resin filling the inside of the cartridge container and having a water content (D) which is 90.0 to 97.0% of a water content (E) in a saturated equilibrium state; and
an external air blocking member for blocking an airflow between the inside of the cartridge and external air.

Advantageous Effects of Invention

According to the present invention, a method for purifying a nonaqueous liquid substance wherein a nonaqueous liquid substance is brought into contact with an ion exchange resin to remove impurities from the nonaqueous liquid substance, with the method being capable of reducing an amount of the nonaqueous liquid substance used for initial blowing and preventing the ion exchange resin in an ion exchange resin-filled cartridge from being contaminated can be provided.

BRIEF DESCRIPTION OF DRAWINGS

FIG. 1 is an end view showing a configuration example of an ion exchange resin-filled cartridge according to the present invention.

FIG. 2 is a perspective view showing individual members configuring the ion exchange resin-filled cartridge 20a in FIG. 1.

FIG. 3 is a schematic end view showing how a water content reduction step is performed.

FIG. 4 is a schematic end view showing how an initial blowing step is performed.

FIG. 5 is a schematic end view showing how a purification step is performed.

FIG. 6 is a schematic end view showing a configuration example of an ion exchange resin-filled cartridge.

FIG. 7 is a schematic end view showing a configuration example of an ion exchange resin-filled cartridge with an external air blocking member according to the present invention.

FIG. 8 is a graph showing results of Example 1 and Comparative Example 1.

FIG. 9 is a graph showing results of Example 1 and Reference Example 1.

FIG. 10 is a graph showing results of Example 2 and Comparative Example 1.

DESCRIPTION OF EMBODIMENTS

A method for purifying a nonaqueous liquid substance according to the present invention will be described with reference to FIG. 1 to FIG. 5. FIG. 1 is a schematic end view showing a configuration example of an ion exchange resin-filled cartridge used for a method for purifying a nonaqueous liquid substance according to the present invention and shows a state of the ion exchange resin-filled cartridge after being subjected to an ion exchange resin filling step. FIG. 2 is a perspective view showing members configuring the ion exchange resin-filled cartridge 20a in FIG. 1. FIG. 3 is a schematic end view showing how a water content reduction step is performed. FIG. 4 is a schematic end view showing how an initial blowing step is performed. FIG. 5 is a schematic end view showing how a purification step is performed.

The ion exchange resin-filled cartridge 20a shown in FIG. 1 is a cartridge exchangeably attached to a metal removing column for removing metals in a nonaqueous liquid substance with an ion exchange resin. The ion exchange resin-filled cartridge 20a has a cylindrical part 2 filled with a granular macroporous type or porous type ion exchange resin 1a in a water-wet state; an upper lid 3 in which a passage hole for liquid to be treated (nonaqueous liquid substance before being purified) 7 is formed and which is provided at an upper end of the cylindrical part 2; a lower lid 4 in which a passage hole for treated liquid (nonaqueous liquid substance after being purified) 8 is formed and which is provided at a lower end of the cylindrical part 2; an insertion pipe 5 which is connected to the lower lid and which is to be inserted into the inside of a treated liquid discharge pipe provided at a bottom part of a housing container of the metal removing column; and the granular macroporous type or porous type ion exchange resin 1a filling the inside of the cylindrical part 2. A groove 51 for O-ring attachment is formed at the outside of the insertion pipe 5 in order to seal the clearance between an inner wall of the treated liquid discharge pipe of the metal removing column and the outside of the insertion pipe 5 of the ion exchange resin-filled cartridge 20a. An O-ring 6 is fitted to the groove 51 for O-ring attachment so as to be attached thereto. Incidentally, the lower lid 4 and the insertion pipe 5 are integrally molded in the configuration example shown in FIG. 1. In addition, the cylindrical part 2, the upper lid 3, and the lower lid 4 to which the insertion pipe 5 is attached form the cartridge container in the configuration example shown in FIG. 1. In addition, an upper end side pipe diameter contracted part 11 is formed at the upper end side inside the cylindrical part 2, and a lower end side pipe diameter contracted part 12 is formed at the lower end side inside the cylindrical part 2. Then, in order to prevent the macroporous type or porous type ion exchange resin 1a from flowing out of the cylindrical part 2, a mesh 9 is attached to an upper end of a filling area of the ion exchange resin, with an outer edge part of the mesh 9 interposed between the upper end side pipe diameter contracted part 11 and the upper lid 3, and a mesh 10 is attached to an lower end of the filling area of the ion exchange resin, with an outer edge part of the mesh 10 interposed between the lower end side pipe diameter contracted part 12 and the lower lid 4. Incidentally, the mesh 9 and the mesh 10 each have an opening which has a size allowing a liquid to be treated to penetrate the opening and not allowing the granular ion exchange resin 1a to penetrate the opening.

As shown in FIG. 2, in assembling the ion exchange resin-filled cartridge 20a, the lower lid 4 integrally molded with the insertion pipe 5 is firstly screwed and fitted into the lower end side of the cylindrical part 2 in a state where the mesh 10 is disposed at the inside of the lower end of the cylindrical part 2. At this time, the mesh 10 is fixed, with the outer edge part thereof interposed between the lower end side pipe diameter contracted part 12 and the lower lid 4. Thereafter, the inside of the cylindrical part 2 is filled with the granular macroporous type or porous type ion exchange resin 1a (not shown) in a water-wet state. Thereafter, the upper lid 3 is screwed and fitted into the upper end side of the cylindrical part 2 in a state where the mesh 9 is disposed at the inside of the upper end of the cylindrical part 2. At this time, the mesh 9 is fixed, with the outer edge part thereof interposed between the upper end side pipe diameter contracted part 11 and the upper lid 3. Thereafter, the O-ring 6 is attached to the groove 51 for O-ring attachment formed in the insertion pipe 5.

Then, an ion exchange resin-filled cartridge in which the cartridge container is filled with the macroporous type or porous type ion exchange resin in a water-wet state is prepared by performing an ion exchange resin filling step.

Thereafter, a water content reduction step is performed using the ion exchange resin-filled cartridge 20a obtained by performing the ion exchange resin filling step, that is, the ion exchange resin-filled cartridge 20a in which the cartridge container is filled with the macroporous type or porous type ion exchange resin 1a in a water-wet state. As shown in FIG. 3, a jig 35 for inert gas introduction in which an inert gas supply port 351 is formed is firstly attached to the side of the upper lid 3 of the ion exchange resin-filled cartridge 20a. Thereafter, an inert gas 29 is allowed to pass through the inside of the cartridge container by supplying the inert gas 29 (before contact) from the inert gas supply port 351, supplying the inert gas 29 to the inside of the cartridge container through the passage hole for liquid to be treated 7, allowing the inert gas 29 (during contact) to pass inside the cartridge container, and discharging the inert gas 29 (after contact) from the inside of the cartridge container through the insertion pipe 5 via the passage hole for treated liquid 8 to bring the inert gas 29 into contact with the macroporous type or porous type ion exchange resin 1a in a water-wet state. At this time, by virtue of bringing the inert gas 29 into contact with the macroporous type or porous type ion exchange resin 1a in a water-wet state, water present on the surface of the macroporous type or porous type ion exchange resin 1a in a water-wet state and present in the vicinity thereof evaporates and transfers to the inert gas 29, and water present on the surface of the macroporous type or porous type ion exchange resin 1a in a water-wet state and present in the vicinity thereof is removed to reduce the water content of the macroporous type or porous type ion exchange resin 1a in a water-wet state. Then, the inert gas 29 keeps in contact with the macroporous type or porous type ion exchange resin 1a in a water-wet state until the water content of the macroporous type or porous type ion exchange resin 1a in a water-wet state becomes a predetermined water content to convert the macroporous type or porous type ion exchange resin 1a in a water-wet state into a macroporous type or porous type ion exchange resin 1b after water content reduction having the predetermined water content. In this manner, an ion exchange resin-filled cartridge 20b in which the cartridge container is filled with the macroporous type or porous type ion exchange resin 1b after water content reduction is prepared by performing the water content reduction step.

Thereafter, as shown in FIG. 4, the ion exchange resin-filled cartridge 20b obtained by performing the water content reduction step is installed in the housing container 21 of the metal removing column 30 to assemble the metal removing column 30. The metal removing column 30 has the housing container 21, a supply port for liquid to be treated 22 formed in the housing container 21 for supplying a liquid to be treated (nonaqueous liquid substance before being purified) to the inside of the housing container, a treated liquid discharge pipe 23 attached to the bottom side of the housing container 21 and communicating with the inside of the housing container 21 for discharging a treated liquid (nonaqueous liquid substance after being purified), and the ion exchange resin-filled cartridge 20b housed within the housing container 21. Then, the insertion pipe 5 of the ion exchange resin-filled cartridge 20b is inserted into the inside of the treated liquid discharge pipe 23, and the clearance between the inner wall of the treated liquid discharge pipe 23 and the outside of the insertion pipe 5 is sealed with the O-ring 6 attached to the outside of the insertion pipe 5 tightly attached to the inner wall 24 of the treated liquid discharge pipe 23 and to the outside of the insertion pipe 5 of the ion exchange resin-filled cartridge 20. In addition, a connection pipe 28 is attached to the supply port for liquid to be treated 22. Then, a pipe end of a liquid transport pipe 26 for the liquid to be treated (nonaqueous liquid substance before being purified) 31 is screwed into the connection pipe 28 to connect the liquid transport pipe 26 for the liquid to be treated (nonaqueous liquid substance after being purified) 31 thereto. In addition, a pipe end of a liquid transport pipe 25 for the treated liquid is screwed into the treated liquid discharge pipe 23 to connect the liquid transport pipe 25 for the treated liquid thereto. In addition, a discharge pipe (not shown) for an initial blow effluent 311 branched from the liquid transport pipe 25 for the treated liquid is attached to the liquid transport pipe 25 for the treated liquid so as to discharge the initial blow effluent 311 to the outside.

Thereafter, the liquid to be treated (nonaqueous liquid substance before being purified) 31 is carried to the metal removing column 30 through the liquid transport pipe 26 for the liquid to be treated connected to the metal removing column 30 from a storage tank of the liquid to be treated 31 or the like and supplied to the inside of the housing container 21 of the metal removing column 30 through the supply port for liquid to be treated 22. Thereafter, a space 27 between the cylindrical part 2 of the ion exchange resin-filled cartridge 21b and the housing container 21 of the metal removing column 30 is firstly filled with the liquid to be treated 31 supplied to the inside of the housing container 21, and the liquid to be treated 31 is subsequently allowed to flow in the inside of the cartridge container of the ion exchange resin-filled cartridge 20b through the passage hole for liquid to be treated 7 formed in the upper lid 3 of the ion exchange resin-filled cartridge 20b. Thereafter, the liquid to be treated 31 having flowed in the inside of the cartridge container of the ion exchange resin-filled cartridge 20b is allowed to pass the filling area of the ion exchange resin while being brought into contact with the ion exchange resin 1b filling the inside of the cartridge container and then discharged to the outside of the cartridge container of the ion exchange resin-filled cartridge 20b through the passage hole for treated liquid (sign 8 in FIG. 1) formed in the lower lid 4 of the cylindrical part 2. The initial blow effluent 311 discharged to the outside of the cartridge container of the ion exchange resin-filled cartridge 20b is discharged through the initial blow effluent discharge pipe branched from the liquid transport pipe 25 for the treated liquid connecting to the metal removing column 30. At this time, the transport pathway for the initial blow effluent 311 is switched to the initial blow effluent discharge pipe side in advance by operating a switching valve attached to the liquid transport pipe 25 for the treated liquid so that the initial blow effluent does not flow into a point of use or a treated liquid storage tank. Then, the liquid to be treated (nonaqueous liquid substance before being purified) 31 keeps in contact with the macroporous type or porous type ion exchange resin 1b after water content reduction until the water concentration (mg $H_2O$/g nonaqueous liquid substance) in the initial blow effluent 311 becomes a predetermined concentration or until reaching a predetermined initial blowing amount. The water concentration in the nonaqueous liquid substance is desirably analyzed by Karl Fischer coulometric titration method.

In this manner, the macroporous type or porous type ion exchange resin is converted into a macroporous type or porous type ion exchange resin 1c after initial blowing by performing the initial blowing step.

Thereafter, the transport pathway for the treated liquid is switched to a point of use or the treated liquid storage tank side by operating the switching valve attached to the liquid transport pipe 25 for the treated liquid, and the liquid to be treated (nonaqueous liquid substance before being purified) 31 is then carried to the metal removing column 30 from the storage tank of the liquid to be treated 31 or the like through the liquid transport pipe 26 for the liquid to be treated connecting to the metal removing column 30 and supplied to the inside of the housing container 21 of the metal removing column 30 through the supply port for liquid to be treated 22 as shown in FIG. 5. Thereafter, the liquid to be treated 31 supplied to the inside of the housing container 21 is firstly allowed to pass the space 27 between the cylindrical part 2 of the ion exchange resin-filled cartridge 20c and the housing container 21 of the metal removing column 30 and subsequently allowed to flow in the inside of the cartridge container of the ion exchange resin-filled cartridge 20c through the passage hole for liquid to be treated 7 formed in the upper lid 3 of the ion exchange resin-filled cartridge 20c. Thereafter, the liquid to be treated 31 having flowed in the inside of the cartridge container of the ion exchange resin-filled cartridge 20c is allowed to pass the filling area of the ion exchange resin while being brought into contact with the macroporous type or porous type ion exchange resin 1c filling the inside of the cartridge container and then discharged to the outside of the cartridge container of the ion exchange resin-filled cartridge 20c through the passage hole for treated liquid (sign 8 in FIG. 1) formed in the lower lid 4 of the cylindrical part 2. The treated liquid (nonaqueous liquid substance after being purified) 32 discharged to the outside of the cartridge container of the ion exchange resin-filled cartridge 20c is carried to a point of use or the storage tank of the treated liquid via the liquid transport pipe 25 for the treated liquid connecting to the metal removing column 30. The purification step is performed in this manner to obtain a nonaqueous liquid substance after being purified.

The method for purifying a nonaqueous liquid substance according to the present invention is a method for purifying a nonaqueous liquid substance wherein a nonaqueous liquid substance is brought into contact with a macroporous type or porous type ion exchange resin to remove impurities from the nonaqueous liquid substance, the method including:

an ion exchange resin filling step of filling a cartridge container with the macroporous type or porous type ion exchange resin in a water-wet state to obtain an ion exchange resin-filled cartridge filled with the macroporous type or porous type ion exchange resin before water content reduction;

a water content reduction step of reducing a water content of the macroporous type or porous type ion exchange resin in the cartridge container until a water content (A) of the macroporous type or porous type ion exchange resin after water content reduction becomes 90.0 to 97.0% of a water content (B) of the macroporous type or porous type ion exchange resin in a saturated equilibrium state;

an initial blowing step of allowing the nonaqueous liquid substance before being purified to pass inside the cartridge container filled with the macroporous type or porous type ion exchange resin after water content reduction and discharging an initial blow effluent from an inside of the cartridge container; and a purification step of performing purification of the nonaqueous liquid substance by allowing the nonaqueous liquid substance before being purified to pass inside the cartridge container and thereby bringing the nonaqueous liquid substance before being purified into contact with the macroporous type or porous type ion exchange resin in the cartridge container to obtain the nonaqueous liquid substance after being purified.

The method for purifying a nonaqueous liquid substance according to the present invention is a method for purifying a nonaqueous liquid substance wherein a nonaqueous liquid substance before being purified, which is a liquid to be treated, is brought into contact with an ion exchange resin to remove impurities from the nonaqueous liquid substance before being purified. In the method for purifying a nonaqueous liquid substance according to the present invention, a target to be purified is a nonaqueous liquid substance before being purified. As the nonaqueous liquid substance before being purified, that is, the liquid to be treated, organic solvents such as IPA (isopropanol), PGMEA (propylene glycol monomethyl ether acetate), PGME (propylene glycol monomethyl ether), PGEE (propylene glycol monoethyl ether), and NMP (N-methyl-2-pyrrolidone) are exemplified.

As the impurities in the nonaqueous liquid substance before being purified, metal ions of Li, Na, Mg, Al, K, Ca, Ti, Cr, Mn, Fe, Co, Ni, Cu, Zn, As, Cd, Pb, and the like; anions of Cl, $SO_4$, $NO_3$, $PO_4$, $CO_3$, $HCO_3$, and the like; organic acids such as formic acid, acetic acid, maleic acid, and propionic acid; and a polymer compound with positive or negative charge are exemplified.

The ion exchange resin used for purifying the nonaqueous liquid substance in the method for purifying a nonaqueous liquid substance according to the present invention is a granular macroporous type or porous type ion exchange resin. Incidentally, a macroporous type or porous type structure is discriminated from a gel type structure according to the following method.

(1) When an ion exchange resin being irradiated with light is observed by an optical microscope, one transmitting light is determined as having a "gel type structure," and one not transmitting light is determined as having a "porous type structure" or "macroporous type structure."

(2) The "gel type structure" is discriminated from the "porous type structure" or "macroporous type structure" by a value of the specific surface area or pore volume of an ion exchange resin measured by an adsorption technique using nitrogen gas or the like (BET method). Generally, an ion exchange resin having a gel type structure has an extremely small specific surface area and has an extremely small pore volume, and the specific surface area of an ion exchange resin having a gel type structure is less than 0.1 $m^2/g$ (dried resin) and the pore volume of an ion exchange resin having a gel type structure is 0.001 to 0.008 ml/ml (dried resin). In addition, an ion exchange resin having a porous type structure or macroporous type structure has a relatively large specific surface area and has a relatively large pore volume, and the specific surface area of an ion exchange resin having a porous type structure or macroporous type structure is 2 to 125 $m^2/g$ (dried resin) and the pore volume of an ion exchange resin having a porous type structure or macroporous type structure is 0.17 to 0.50 ml/ml (dried resin).

As the macroporous type or porous type ion exchange resin, a macroporous type or porous type cation exchange resin, a macroporous type or porous type anion exchange resin, and a combination of a macroporous type or porous type cation exchange resin and a macroporous type or porous type anion exchange resin are exemplified. When the macroporous type or porous type ion exchange resin is a combination of a macroporous type or porous type cation exchange resin and a macroporous type or porous type anion exchange resin, a mixed bed in which a macroporous type or porous type cation exchange resin and a macroporous type or porous type anion exchange resin are uniformly mixed may be used, or a double bed in which a macroporous type or porous type cation exchange resin fills an upstream side of the filling area of the macroporous type or porous type ion exchange resin and a macroporous type or porous type anion exchange resin fills a downstream side of the filling area of the macroporous type or porous type ion exchange resin or a double bed in which a macroporous type or porous type anion exchange resin fills the upstream side of the filling area of the macroporous type or porous type ion exchange resin and a macroporous type or porous type cation exchange resin fills the downstream side of the filling area of the macroporous type or porous type ion exchange resin may be used.

The macroporous type or porous type cation exchange resin may be a macroporous type or porous type strongly acidic cation exchange resin or a macroporous type or porous type weakly acidic cation exchange resin, or a combination thereof may be used. As the macroporous type or porous type strongly acidic cation exchange resin, Orlite DS-4 and the like are exemplified. In addition, as the macroporous type or porous type weakly acidic cation exchange resin, Amberlite IRC 76, Amberlite IRC 747 UPS, Amberlite IRC 748, Amberlite IRC 743, and the like are exemplified.

The macroporous type or porous type anion exchange resin may be a macroporous type or porous type strongly basic anion exchange resin or a macroporous type or porous type weakly basic anion exchange resin, or a combination thereof may be used. As the macroporous type or porous type strongly basic anion exchange resin, Orlite DS-5 and the like are exemplified. In addition, as the macroporous type or porous type weakly basic anion exchange resin, Orlite DS-6 and the like are exemplified. As a mixed product of the macroporous type or porous type strongly acidic cation exchange resin and the macroporous type or porous type strongly basic anion exchange resin, Orlite DS-7 is exemplified.

While an average particle diameter of the macroporous type or porous type ion exchange resin in a dried state is not particularly limited, it is preferably 200 to 1000 μm and particularly preferably 200 to 500 μm. Incidentally, the average particle diameter of the macroporous type or porous type ion exchange resin in a dried state is a value measured by a laser diffraction-type particle size distribution measuring device.

The macroporous type or porous type ion exchange resin is usually manufactured in a state of containing water. In addition, the macroporous type or porous type ion exchange resin is also present in a state of containing water at the time of sale, distribution, filling of the ion exchange resin at a place of use, and the like. Then, in the present invention, the macroporous type or porous type ion exchange resin in a state of containing water is referred to as the "macroporous type or porous type ion exchange resin in a water-wet state," and in the water-wet state, a state where water within resin pores is adjusted to achieve a saturated equilibrium state under a condition in which a relative humidity at 25° C. is 100% is referred to as the "macroporous type or porous type ion exchange resin in a saturated equilibrium state." A state at which a water content is 0% by mass after drying with an appropriate drying method is referred to as the "macroporous type or porous type ion exchange resin in a dried state."

The macroporous type or porous type ion exchange resin in a saturated equilibrium state is obtained by bringing the macroporous type or porous type ion exchange resin into contact with the atmospheric air, which has a relative humidity of 100% at 25° C., for 30 minutes or longer to put the macroporous type or porous type ion exchange resin in a saturated state. The macroporous type or porous type ion exchange resin in a dried state is obtained by drying the macroporous type or porous type ion exchange resin in a water-wet state at 105° C. for 16 hours in a constant temperature dryer. The water content (%) (B) of the macroporous type or porous type ion exchange resin in a saturated equilibrium state is obtained by the equation "((weight of macroporous type or porous type ion exchange resin in saturated equilibrium state before drying−weight of macroporous type or porous type ion exchange resin in dried state)/weight of macroporous type or porous type ion exchange resin in saturated equilibrium state before drying)×100." Incidentally, in order to enhance measurement accuracy, a collecting amount of the macroporous type or porous type ion exchange resin in a saturated equilibrium state before drying is preferably 5 g or more.

Similarly, the water content (%) (A) of the macroporous type or porous type ion exchange resin after water content reduction is obtained by weighing 5 g or more of a resin to be measured, drying the weighed resin at 105° C. for 16 hours in a constant temperature dryer, and using the equation "((weight of macroporous type or porous type ion exchange resin after water content reduction−weight of macroporous type or porous type ion exchange resin in dried state)/weight of macroporous type or porous type ion exchange resin after water content reduction)×100."

Similarly, the water content (%) (C) of the macroporous type or porous type ion exchange resin before water content reduction is also obtained by weighing 5 g or more of a resin to be measured, drying the weighed resin at 105° C. for 16 hours in a constant temperature dryer, and using the equation "((weight of macroporous type or porous type ion exchange resin before water content reduction−weight of macroporous type or porous type ion exchange resin in dried state)/weight of macroporous type or porous type ion exchange resin before water content reduction)×100."

The ion exchange resin filling step according to the method for purifying a nonaqueous liquid substance of the present invention is a step of filling a cartridge container with the macroporous type or porous type ion exchange resin in a water-wet state to obtain an ion exchange resin-filled cartridge filled with the macroporous type or porous type ion exchange resin before water content reduction.

The cartridge container according to the ion exchange resin filling step is a filling container for the ion exchange resin, the inside of which is filled with the macroporous type or porous type ion exchange resin in a water-wet state. While the cartridge container is not particularly limited and is appropriately selected according to the shape of the metal removing column in which the ion exchange resin-filled cartridge is installed, and the like, the cartridge container usually includes a cylindrical member and a lid member blocking both ends of the cylindrical member, for example. A supply port for liquid to be treated for supplying the nonaqueous liquid substance before being purified (liquid to be treated) to the inside of the cartridge container is formed in one end part of the cartridge container, and a discharge port for liquid to be treated for discharging a nonaqueous liquid substance after being purified (treated liquid) from the inside of the cartridge container is formed in the other end part of the cartridge container.

A material for the cartridge container is not particularly limited, and examples thereof include a polytetrafluoroethylene (PTFE), a tetrafluoroethylene perfluoroalkyl vinyl ether copolymer (PFA), a tetrafluoroethylene-ethylene copolymer (ETFE), a low-density polyethylene, and a high-density polyethylene. The material for the cartridge container is appropriately selected according to the type of the liquid to be treated, the type of a dissolved substance, and the like.

The ion exchange resin for filling the inside of the cartridge container in the ion exchange resin filling step is an ion exchange resin in a water-wet state. A water content (C) of the macroporous type or porous type ion exchange resin in a water-wet state for filling the inside of the cartridge container in the ion exchange resin filling step, that is, the macroporous type or porous type ion exchange resin before water content reduction is preferably 95 to 100% and particularly preferably 98 to 100% of a water content (B) of the macroporous type or porous type ion exchange resin in a saturated equilibrium state. The water content of an industrially produced macroporous type or porous type ion exchange resin is usually 95 to 100% of the water content (B) of the macroporous type or porous type ion exchange resin in a saturated equilibrium state, and the water content of a commercially available macroporous type or porous type ion exchange resin is usually 95 to 100% of the water content (B) of the macroporous type or porous type ion exchange resin in a saturated equilibrium state. Therefore, an industrially produced macroporous type or porous type ion exchange resin in a water-wet state or a commercially available macroporous type or porous type ion exchange resin in a water-wet state is preferably used in the ion exchange resin filling step. Incidentally, the phrase "a water content (C) of the macroporous type or porous type ion exchange resin in a water-wet state is preferably 95 to 100% and particularly preferably 98 to 100% of a water content (B) of the macroporous type or porous type ion exchange resin in a saturated equilibrium state" refers to that the percentage calculated by ("water content (C) of macroporous type or porous type ion exchange resin in water-wet state actually used for filling in ion exchange resin filling step, that is, macroporous type or porous type ion exchange resin before water content reduction"/"water content (B) of macroporous type or porous type ion exchange resin in saturated equilibrium state")×100 is preferably 95 to 100% and particularly preferably 98 to 100%.

A method for filling the inside of the cartridge container with the ion exchange resin in a water-wet state in the ion exchange resin filling step is not particularly limited, and a method in which no foreign matter is mixed at the time of filling is appropriately selected.

The ion exchange resin-filled cartridge obtained by performing the ion exchange resin filling step is an ion exchange resin-filled cartridge in which the cartridge container is filled with the ion exchange resin in a water-wet state. Since the ion exchange resin-filled cartridge obtained by performing the ion exchange resin filling step is an ion exchange resin-filled cartridge before performing the water content reduction step, the ion exchange resin-filled cartridge obtained by performing the ion exchange resin filling step is restated as an ion exchange resin-filled cartridge in which the cartridge container is filled with the ion exchange resin before water content reduction.

The water content reduction step according to the method for purifying a nonaqueous liquid substance of the present invention is a step of reducing the water content of the ion exchange resin in the cartridge container until a water content (A) of the macroporous type or porous type ion exchange resin after water content reduction becomes 90.0 to 97.0% and preferably becomes 90 to 95% of the water content (B) of the macroporous type or porous type ion exchange resin in a saturated equilibrium state. Incidentally, the phrase "until a water content (A) of the macroporous type or porous type ion exchange resin after water content reduction becomes 90.0 to 97.0% and preferably becomes 90 to 95% of the water content (B) of the macroporous type or porous type ion exchange resin in a saturated equilibrium state" refers to until the percentage calculated by ("water content (A) of macroporous type or porous type ion exchange resin having been subjected to water content reduction in water content reduction step"/"water content (B) of macroporous type or porous type ion exchange resin in saturated equilibrium state")×100 becomes 90.0 to 97.0% and preferably becomes 90 to 95%.

In the method for purifying a nonaqueous liquid substance according to the present invention, the water content reduction step can be performed by allowing an inert gas to pass inside the cartridge container to bring the inert gas into contact with the ion exchange resin in the cartridge container (hereinafter such a configuration is also described as water content reduction step (1)).

As the inert gas according to water content reduction step (1), nitrogen gas, helium gas, argon gas, and the like are exemplified. The higher the purity of the inert gas is, the more preferable, but the purity may be 99.9% by volume or more. A dew point of the inert gas is preferably −50° C. or less and particularly preferably −60° C. or less.

In water content reduction step (1), a temperature of the inert gas at the time of supplying the inert gas to the inside of the cartridge container is preferably 0 to 60° C. and particularly preferably 10 to 30° C.

In water content reduction step (1), by virtue of bringing the inert gas into contact with the macroporous type or porous type ion exchange resin in a water-wet state, water present on the surface of the macroporous type or porous type ion exchange resin in a water-wet state and present in the vicinity thereof evaporates and transfers to the inert gas, and water present on the surface of the macroporous type or porous type ion exchange resin in a water-wet state and present in the vicinity thereof is removed to reduce the water content of the macroporous type or porous type ion exchange resin in a water-wet state.

Then, in water content reduction step (1), the inert gas keeps in contact with the macroporous type or porous type ion exchange resin in a water-wet state until the water content (A) of the macroporous type or porous type ion exchange resin after water content reduction becomes 90.0 to 97.0% and preferably becomes 90 to 95% of the water content (B) of the macroporous type or porous type ion exchange resin in a saturated equilibrium state to convert the macroporous type or porous type ion exchange resin in a water-wet state into a macroporous type or porous type ion exchange resin having a predetermined water content.

In water content reduction step (1), a method for allowing the inert gas to pass inside the cartridge container to bring the inert gas into contact with the macroporous type or porous type ion exchange resin in the cartridge container is not particularly limited, and a method in which the inert gas is supplied to the inside of the cartridge container from one end side of the cartridge container and the inert gas is simultaneously discharged from the inside of the cartridge container through the other end side of the cartridge container may be employed.

The inert gas which has been used in water content reduction step (1) and which contains water from the macroporous type or porous type ion exchange resin may be treated by an inert gas dehydrating device to reduce the water content in the inert gas and used as the inert gas to be supplied to the inside of the cartridge container in water content reduction step (1) again.

In addition, the method for purifying a nonaqueous liquid substance according to the present invention can perform the water content reduction step by reducing the pressure within the cartridge container to vacuum drying the ion exchange resin (hereinafter such a configuration is also described as water content reduction step (2)).

In water content reduction step (2), an absolute pressure in vacuum drying is preferably −0.05 MPa or less. In addition, a temperature in vacuum drying is preferably 0 to 60° C. and particularly preferably 30 to 50° C. A known vacuum dryer may be used for putting a resin to be treated under the above heating and vacuum drying conditions.

In water content reduction step (2), by virtue of vacuum drying the macroporous type or porous type ion exchange resin in a water-wet state, water present on the surface of the macroporous type or porous type ion exchange resin in a water-wet state and present in the vicinity thereof evaporates, and water present on the surface of the macroporous type or porous type ion exchange resin in a water-wet state and present in the vicinity thereof is removed to reduce the water content of the macroporous type or porous type ion exchange resin in a water-wet state.

Then, in water content reduction step (2), the macroporous type or porous type ion exchange resin in a water-wet state is subjected to vacuum drying until the water content (A) of the macroporous type or porous type ion exchange resin after water content reduction becomes 90.0 to 97.0% and preferably becomes 90 to 95% of the water content (B) of the macroporous type or porous type ion exchange resin in a saturated equilibrium state to convert the macroporous type or porous type ion exchange resin in a water-wet state into the macroporous type or porous type ion exchange resin after water content reduction which has a predetermined water content.

In water content reduction step (2), a method for vacuum drying the macroporous type or porous type ion exchange resin in a water-wet state is not particularly limited, and examples thereof include a method in which vacuum drying is performed by allowing the ion exchange resin-filled cartridge to stand in a vacuum drying device and reducing the pressure within the vacuum drying device or reducing the pressure within the vacuum drying device while heating the inside of the vacuum drying device. Incidentally, when the pressure within the vacuum drying device is returned to atmospheric pressure after vacuum drying, the pressure is preferably returned to atmospheric pressure by introducing a high purity inert gas into the vacuum device so as to prevent impurities in the atmospheric air from being mixed.

In addition, the method for purifying a nonaqueous liquid substance according to the present invention can perform the water content reduction step by heating the ion exchange resin-filled cartridge filled with the macroporous type or porous type ion exchange resin in a heating device under an inert gas atmosphere (hereinafter such a configuration is also described as water content reduction step (3)).

In water content reduction step (3), a heating temperature at the time of heating the ion exchange resin-filled cartridge is preferably 0 to 60° C. and particularly preferably 30 to 50° C.

In water content reduction step (3), by virtue of heating the macroporous type or porous type ion exchange resin in a water-wet state, water present on the surface of the macroporous type or porous type ion exchange resin in a water-wet state and present in the vicinity thereof evaporates, and water present on the surface of the macroporous type or porous type ion exchange resin in a water-wet state and present in the vicinity thereof is removed to reduce the water content of the macroporous type or porous type ion exchange resin in a water-wet state.

Then, in water content reduction step (3), the ion exchange resin in a water-wet state is heated until the water content (A) of the macroporous type or porous type ion exchange resin after water content reduction becomes 90.0 to 97.0% and preferably becomes 90 to 95% of the water content (B) of the macroporous type or porous type ion exchange resin in a saturated equilibrium state to convert the macroporous type or porous type ion exchange resin in a water-wet state into the macroporous type or porous type ion exchange resin after water content reduction which has a predetermined water content.

In water content reduction step (3), a method for heating the macroporous type or porous type ion exchange resin in a water-wet state is not particularly limited, and a method capable of heating the ion exchange resin-filled cartridge in a heating device under an inert gas atmosphere may be employed.

In this manner, the macroporous type or porous type ion exchange resin in a water-wet state (macroporous type or porous type ion exchange resin before water content reduction) is converted into the macroporous type or porous type ion exchange resin having a water content of a predetermined value (macroporous type or porous type ion exchange resin after water content reduction) by performing the water content reduction step to obtain an ion exchange resin-filled cartridge in which the cartridge container is filled with the macroporous type or porous type ion exchange resin after water content reduction. Then, when the degree of reduction in water content in the water content reduction step is set such that the water content (A) of the macroporous type or porous type ion exchange resin after water content reduction becomes 90.0 to 97.0% and preferably becomes 90 to 95% of the water content (B) of the macroporous type or porous type ion exchange resin in a saturated equilibrium state, reduction in water content can be performed in a simple method such as water content reduction step (1), water content reduction step (2), and water content reduction step (3), and an amount of the initial blow effluent can be decreased even when a load for water content reduction is reduced. On the other hand, when the ratio of the water content (A) of the macroporous type or porous type ion exchange resin after water content reduction to the water content (B) of the macroporous type or porous type ion exchange resin in a saturated equilibrium state exceeds the above range, the amount of the initial blow effluent increases. In addition, when the ratio of the water content (A) of the macroporous type or porous type ion exchange resin after water content reduction to the water content (B) of the macroporous type or porous type ion exchange resin in a saturated equilibrium state is less than the above range, while the amount of the initial blow effluent decreases, time required for reducing the water content of the macroporous type or porous type ion exchange resin increases, and cost becomes high in some cases.

The initial blowing step according to the method for purifying a nonaqueous liquid substance of the present invention is a step of allowing the nonaqueous liquid substance before being purified to pass inside the cartridge container filled with the macroporous type or porous type ion exchange resin after water content reduction and discharging the initial blow effluent from the inside of the cartridge container.

The initial blowing step is a pretreatment step performed before purifying the nonaqueous liquid substance and is performed for allowing purification to be normally performed by reducing the water content by mainly substituting water contained in the macroporous type or porous type ion exchange resin with the nonaqueous liquid substance and reducing water eluted from the macroporous type or porous type ion exchange resin to the nonaqueous liquid substance.

Then, in the initial blowing step, the nonaqueous liquid substance before being purified continues to pass inside the cartridge container filled with the macroporous type or porous type ion exchange resin after water content reduction until the ion exchange-filled cartridge becomes a predetermined state. The initial blow effluent is generated at this time.

The purification step according to the method for purifying a nonaqueous liquid substance of the present invention is a step of bringing the nonaqueous liquid substance before being purified into contact with the macroporous type or porous type ion exchange resin in the cartridge container by allowing the nonaqueous liquid substance before being purified to pass inside the cartridge container of the ion exchange resin-filled cartridge having been subjected to the initial blowing step to perform purification of the nonaqueous liquid substance and obtain a purified nonaqueous liquid substance.

Then, a high purity nonaqueous liquid substance from which impurities have been removed is obtained by performing the purification step.

The present inventors have found that (1) a large part of water flowing out of the ion exchange resin through contact with the nonaqueous liquid substance during initial blowing is water present as free water molecules which are not in a hydration state with an ion exchange group on the surface of the macroporous type or porous type ion exchange resin and in the pores inside thereof, and water molecules in a hydration state with an ion exchange group in the pores of the ion exchange resin hardly flow out of the ion exchange resin even if the water molecules contact with the nonaqueous liquid substance, that (2) when the water content of the ion exchange resin in a water-wet state is reduced by continuously bringing the inert gas into contact with the ion exchange resin, by vacuum drying the ion exchange resin, by heating the ion exchange resin, or the like, by virtue of reducing the water content until the water content (A) of the ion exchange resin after water content reduction becomes 90.0 to 97.0% and preferably becomes 90 to 95% of the water content (B) of the ion exchange resin in a saturated equilibrium state, free water molecules which are not in a hydration state with an ion exchange group on the surface and in the inside pores and which easily flow out of the ion exchange resin during initial blowing can be decreased, and consequently an amount of water flowing out to the initial blow effluent can be reduced, and that (3) the amount of initial blow effluent can be decreased thereby.

On the other hand, while it is possible to dry the ion exchange resin before filling the cartridge container therewith in order to eliminate an influence of water in the ion exchange resin during initial blowing, mixing of impurities into the ion exchange resin is caused due to contact with a metal or contact with the atmospheric air containing metals or fine particles during a drying step and a step of transferring the ion exchange resin after being dried to the cartridge.

In the method for purifying a nonaqueous liquid substance according to the present invention, after performing the ion exchange resin filling step and the water content reduction step, the initial blowing step and the purification step are performed by installing the ion exchange resin-filled cartridge in the metal removing column, supplying the nonaqueous liquid substance before being purified to the inside of the metal removing column, and allowing the nonaqueous liquid substance before being purified to pass inside the cartridge container of the ion exchange resin-filled cartridge through the inside of the housing container of the metal removing column as with the configuration example shown in FIG. 1 to FIG. 5. However, the present invention is not limited thereto. As a configuration of the method for purifying a nonaqueous liquid substance according to the present invention, a configuration in which after performing the ion exchange resin filling step and the water content reduction step, the initial blowing step and the purification step are performed by installing the ion exchange resin-filled cartridge in the metal removing column, supplying the nonaqueous liquid substance before being purified to the inside of the metal removing column, and allowing the nonaqueous liquid substance before being purified to pass inside the cartridge container of the ion exchange resin-filled cartridge through the inside of the housing container of the metal removing column is exemplified. In addition, as another configuration of the method for purifying a nonaqueous liquid substance according to the present invention, a configuration in which after performing the ion exchange resin filling step and the water content reduction step, the initial blowing step and the purification step are performed by allowing the nonaqueous liquid substance before being purified to directly pass inside the cartridge container of the ion exchange resin-filled cartridge is exemplified. That is, this additional configuration of the method for purifying a nonaqueous liquid substance according to the present invention is a configuration directly supplying the nonaqueous liquid substance before being purified to the inside of the cartridge container of the ion exchange resin-filled cartridge without using the metal removing column.

In the method for purifying a nonaqueous liquid substance according to the present invention, examples of the ion exchange resin-filled cartridge used for the configuration in which after performing the ion exchange resin filling step and the water content reduction step, the initial blowing step and the purification step are performed by allowing the nonaqueous liquid substance before being purified to directly pass inside the cartridge container of the ion exchange resin-filled cartridge include an ion exchange resin-filled cartridge 120 shown in FIG. 6. The ion exchange resin-filled cartridge 120 has a cylindrical part 2 filled with a granular ion exchange resin 1a in a water-wet state; an upper lid 103 in which a passage hole for liquid to be treated (nonaqueous liquid substance before being purified) 7 is formed and to which a connection part 102 screwed into a pipe end of a liquid transport pipe for a liquid to be treated (nonaqueous liquid substance before being purified) is attached, the upper lid 103 provided at an upper end of the cylindrical part 2; a lower lid 4 in which a passage hole for treated liquid (nonaqueous liquid substance after being purified) 8 is formed and which is provided at a lower end of the cylindrical part 2; a treated liquid discharge pipe 105 which is connected to the lower lid and which is screwed into a pipe end of a liquid transport pipe for a treated liquid (nonaqueous liquid substance after being purified); and the granular ion exchange resin 1a filling the inside of the cylindrical part 2. Incidentally, in the configuration example shown in FIG. 6, the lower lid 4 and the treated liquid discharge pipe 105 are integrally molded. In addition, in the configuration example shown in FIG. 6, the cylindrical part 2, the upper lid 3, and the lower lid 4 to which the treated liquid discharge pipe 105 is attached form the cartridge container. In addition, an upper end side pipe diameter contracted part 11 is formed at the upper end side inside the cylindrical part 2, and a lower end side pipe diameter contracted part 12 is formed at the lower end side inside the cylindrical part 2. Then, in order to prevent the ion exchange resin 1 from flowing out of the cylindrical part 2, a mesh 9 is attached to an upper end of a filling area of the ion exchange resin, with an outer edge part of the mesh 9 interposed between the upper end side pipe diameter contracted part 11 and the upper lid 3, and a mesh 10 is attached to a lower end of the filling area of the ion exchange resin, with an outer edge part of the mesh 10 interposed between the lower end side pipe diameter contracted part 12 and the lower lid 4. Incidentally, the mesh 9 and the mesh 10 each have an opening which has a size allowing the liquid to be treated to penetrate the opening and not allowing the granular ion exchange resin 1a to penetrate the opening.

In addition, in the method for purifying a nonaqueous liquid substance according to the present invention, after performing the ion exchange resin filling step and the water content reduction step, the initial blowing step and the purification step are performed after installing the ion exchange resin-filled cartridge in the metal removing column as with the configuration example shown in FIG. 1 to FIG. 5. However, the present invention is not limited thereto in a case where water content reduction step (1) is employed as the water content reduction step. In the method for purifying a nonaqueous liquid substance according to the present invention, as a configuration in which water content reduction step (1) is employed as the water content reduction step, a configuration in which after performing the ion exchange resin filling step and the water content reduction step, the initial blowing step and the purification step are performed after installing the ion exchange resin-filled cartridge in the metal removing column is exemplified. In the method for purifying a nonaqueous liquid substance according to the present invention, as another configuration employing water content reduction step (1) as the water content reduction step, a configuration in which after performing the ion exchange resin filling step, water content reduction step (1) is performed by installing the ion exchange resin-filled cartridge in the metal removing column, introducing the inert gas from an inert gas introduction pipe provided at an appropriate position such as the metal removing column, the liquid transport pipe for the liquid to be treated, or the like, and discharging the inert gas from an inert gas discharge pipe provided at an appropriate position such as the metal removing column, the liquid transport pipe for the treated liquid, or the like, followed by performing the initial blowing step and the purification step.

The ion exchange resin-filled cartridge with an external air blocking member according to the present invention is an ion exchange resin-filled cartridge with an external air blocking member, including:

an ion exchange resin-filled cartridge having
a cartridge container,
a supply port for supplying a nonaqueous liquid substance to the inside of the cartridge container,
a discharge port for discharging the nonaqueous liquid substance from the inside of the cartridge container, and
a macroporous type or porous type ion exchange resin filling the inside of the cartridge container and having a water content (D) which is 90.0 to 97.0% of a water content (E) in a saturated equilibrium state; and
an external air blocking member for blocking an airflow between the inside of the cartridge and external air.

The cartridge container according to the ion exchange resin-filled cartridge with an external air blocking member of the present invention is similar to the cartridge container according to the method for purifying a nonaqueous liquid substance of the present invention.

In the ion exchange resin-filled cartridge with an external air blocking member according to the present invention, the macroporous type or porous type ion exchange resin filling the inside of the cartridge container is a macroporous type or porous type ion exchange resin having a water content (D) which is 90.0 to 97.0% and preferably 90 to 95% of the water content (E) in a saturated equilibrium state. Incidentally, the phrase "a water content (D) of the macroporous type or porous type ion exchange resin filling the inside of the cartridge container is 90.0 to 97.0% and preferably 90 to 95% of a water content (E) of the macroporous type or porous type ion exchange resin in a saturated equilibrium state" refers to that the percentage calculated by ("water content (D) of macroporous type or porous type ion exchange resin filling inside of cartridge container"/"water content (E) of macroporous type or porous type ion exchange resin in saturated equilibrium state")×100 is 90.0 to 97.0% and preferably 90 to 95%.

The external air blocking member according to the ion exchange resin-filled cartridge with an external air blocking member of the present invention is a member for blocking an airflow between the inside of the cartridge and the external air.

As the external air blocking member, a configuration example shown in FIG. 7 is exemplified, for example. In FIG. 7, in the ion exchange resin-filled cartridge 40 with an external air blocking member, an upper side cap member 33a is attached to the upper end side of the cylindrical part of an ion exchange resin-filled cartridge 20a so as to completely cover the passage hole for liquid to be treated formed in the upper lid of the cylindrical part, and a lower side cap member 33b is attached to the lower end side of the cylindrical part of the ion exchange resin-filled cartridge 20a so as to completely cover the passage hole for treated liquid and the port of the insertion pipe formed on the lower lid of the cylindrical part. Then, the clearance between the upper side cap member 33a and the cylindrical part and the clearance between the lower side cap member 33b and the cylindrical part are sealed to such an extent as to prevent the external air from entering the inside of the cartridge container.

A material for the cap members is not particularly limited, and examples thereof include a polytetrafluoroethylene (PTFE), a tetrafluoroethylene perfluoroalkyl vinyl ether copolymer (PFA), a tetrafluoroethylene-ethylene copolymer (ETFE), a low-density polyethylene, and a high-density polyethylene.

A member for enhancing sealability such as an O-ring and a seal tape may be attached to the inner side of each of the upper side cap member 33a and the lower side cap member 33b.

As another configuration example of the external air blocking member, an enclosing bag enclosing the entire of the ion exchange resin-filled cartridge and blocking the airflow between the inside and the external air is exemplified, for example. A material for the enclosing bag is a material not transmitting air.

Since the water content (D) of the macroporous type or porous type ion exchange resin filling the inside of the cartridge container is 90.0 to 97.0% and preferably 90 to 95% of the water content (E) in a saturated equilibrium state, that is, since a macroporous type or porous type ion exchange resin in which water on the surface thereof and in the vicinity thereof easily flowing out of the ion exchange resin during initial blowing is reduced fills the inside of the cartridge container in the ion exchange resin-filled cartridge with the external air blocking member according to the present invention, the initial blow effluent can be decreased by performing the initial blowing step and the purification step using the ion exchange resin-filled cartridge with the external air blocking member according to the present invention.

EXAMPLES

Hereinafter, the present invention will be described in detail on the basis of examples. However, the present invention is not limited to the following examples.

Example 1

Water Content Reduction Test
<Ion Exchange Resin Filling Step>
The ion exchange resin A described below was brought into contact with the atmospheric air, which had a relative humidity of 100% at 25° C., for 30 minutes or longer to obtain an ion exchange resin A in a saturated equilibrium state (water content: 60.8%).

Thereafter, a cartridge container was filled with the cation exchange resin A in its saturated equilibrium state as an ion exchange resin to prepare an ion exchange resin-filled cartridge B shown in FIG. 1. Specifics of the filling ion exchange resin and an O-ring are shown below, and specifics of the cartridge container are shown in Table 1.

<Water Content Reduction Step>
Thereafter, the ion exchange resin-filled cartridge B was supplied with nitrogen gas (purity: 99.99% or more) at a temperature of 25° C. at a flow rate of 60 L/hour for 75 minutes, and the nitrogen gas is allowed to pass inside the ion exchange resin-filled cartridge B so as to reduce the water content of the ion exchange resin to obtain an ion exchange resin-filled cartridge C filled with the ion exchange resin after water content reduction.

<Calculation of Water Content Reduction>
Thereafter, supply of nitrogen gas was stopped, the ion exchange resin in the ion exchange resin-filled cartridge C was taken out, and the water content thereof was measured. As a result, the water content was 58.0%. Consequently, the water content (A) of the ion exchange resin after water content reduction was calculated as 95% of the water content (B) of the ion exchange resin in its saturated equilibrium state.

Initial Blowing Test
The ion exchange resin filling step and the water content reduction step were performed in the same manner as described above to prepare an ion exchange resin-filled cartridge C.

<Initial Blowing Step>
A metal removing column was assembled by installing the ion exchange resin-filled cartridge C in a PFA demetallizing filter housing manufactured by Pall Corporation.

Thereafter, the initial blowing step was performed by supplying, as a liquid to be treated, isopropyl alcohol (SE grade, water content: 50 ppm by mass or less) to the metal removing column at $SV=4\ h^{-1}$, and continuously supplying the liquid to be treated, isopropyl alcohol, until the bed volume (BV) became 30. A change in the water amount within the initial blow effluent generated during the initial blowing step was measured. As a result, the water content at the time at which BV=10.5 was 800 ppm by mass, and the water content at the time at which BV=14 was 400 ppm by mass. In addition, the change in the water amount within the initial blow effluent is shown in FIG. 8.

<Purification Step>
The liquid to be treated, isopropyl alcohol, was continuously supplied to the metal removing column, isopropyl alcohol obtained as a treated liquid was collected at the time at which the bed volume (BV) was 18, and the water content thereof was measured. As a result, the water content of the isopropyl alcohol treated liquid was 200 ppm.

<Ion Exchange Resin>
Ion exchange resin A: a mixed product of a macroporous type strongly acidic cation exchange resin and a macroporous type strongly basic anion exchange resin, manufactured by Organo Corporation (Orlite DS-7); material of resin: styrene-divinyl benzene copolymer; type of ion exchange group: sulfonic acid group, trimethyl ammonium group; ion exchange equivalent: cation exchange group 1.7 mg equivalent/ml wet resin or more, anion exchange group 0.8 mg equivalent/ml wet resin or more; average particle diameter at dried state: 400 to 80 μm; water content in saturated equilibrium state: 61% by mass.

<O-Ring>

Manufactured by FLON INDUSTRY; trade name: PFA-covered O-ring; material: Viton covered with PFA; wire diameter: 3.53±0.10 mm; inner diameter: 37.69±0.38 mm; outer diameter: 44.75 mm

TABLE 1

| Cylindrical part | |
| --- | --- |
| Material | PTFE |
| Inner diameter (mm) | 75 |
| Outer diameter (mm) | 85 |
| Length (mm) | 225 |
| Upper lid | |
| Material | PTFE |
| Thickness (mm) | 10 |
| Diameter of passage hole (mm) | 5 |
| Number of passage hole | 37 |
| Lower lid | |
| Material | PTFE |
| Thickness (mm) | 10 |
| Diameter of passage hole (mm) | 5 |
| Number of passage hole | 19 |
| Insertion pipe | |
| Material | PTFE |
| Inner diameter (mm) | 33 |
| Outer diameter (mm) | 44 |

<Measurement of Water Content>

An ion exchange resin in a saturated equilibrium state was obtained by bringing the ion exchange resin into contact with the atmospheric air, which has a relative humidity of 100% at 25° C., for 30 minutes or longer to put the ion exchange resin in its saturated state. In addition, the ion exchange resin in its saturated equilibrium state was dried at 105° C. for 16 hours in a constant temperature dryer to obtain an ion exchange resin in a dried state. Then, the water content (%) (B) of the macroporous type ion exchange resin in its saturated equilibrium state was obtained by the equation "((weight of macroporous type ion exchange resin in saturated equilibrium state before drying−weight of macroporous type ion exchange resin in dried state)/weight of macroporous type ion exchange resin in saturated equilibrium state before drying)×100." Incidentally, in order to enhance measurement accuracy, the measurement was performed by collecting 5 g or more of the ion exchange resin in its saturated equilibrium state before drying.

Comparative Example 1

The ion exchange resin filling step was performed in the same manner as Example 1 to prepare an ion exchange resin-filled cartridge B.

Thereafter, a metal removing column was assembled by installing the ion exchange resin-filled cartridge B in a PFA demetallizing filter housing manufactured by Pall Corporation.

Thereafter, the initial blowing step was performed by supplying, as a liquid to be treated, isopropyl alcohol (SE grade, water content: 50 ppm by mass or less) to the metal removing column at SV=4 $h^{-1}$, and continuously supplying the liquid to be treated, isopropyl alcohol, until the bed volume (BV) became 30. A change in the water amount within the initial blow effluent generated during the initial blowing step was measured. As a result, the water content at the time at which BV=12.5 was 800 ppm by mass, and the water content at the time at which BV=16 was 400 ppm by mass. In addition, the change in the water amount within the initial blow effluent is shown in FIG. 8.

That is, in Comparative Example 1, the initial blowing test was performed by using an ion exchange resin without being subjected to the water content reduction step.

Reference Example 1

The ion exchange resin filling step was performed in the same manner as Example 1 to prepare an ion exchange resin-filled cartridge B.

<Drying of Ion Exchange Resin>

Thereafter, the ion exchange resin-filled cartridge B was placed in a vacuum dryer and vacuum dried under a condition of 50° C. and 0.1 MPa gage pressure for 21 hours to obtain an ion exchange resin-filled cartridge D filled with the ion exchange resin after vacuum drying.

<Calculation of Water Content>

Thereafter, supply of nitrogen gas was stopped, the ion exchange resin in the ion exchange resin-filled cartridge D was taken out, and the water content thereof was measured. As a result, the water content was 6%. Consequently, the water content of the ion exchange resin after vacuum drying was calculated as 10% of the water content (B) of the ion exchange resin in its saturated equilibrium state.

<Initial Blowing Test>

The ion exchange resin filling step and the water content reduction step were performed in the same manner as described above to prepare an ion exchange resin-filled cartridge D.

Thereafter, a metal removing column was assembled by installing the ion exchange resin-filled cartridge D in a PFA demetallizing filter housing manufactured by Pall Corporation.

Thereafter, the initial blowing step was performed by supplying, as a liquid to be treated, isopropyl alcohol (SE grade, water content: 50 ppm by mass or less) to the metal removing column at SV=4 $h^{-1}$, and continuously supplying the liquid to be treated, isopropyl alcohol, until the bed volume (BV) became 30. A change in the water amount within the initial blow effluent generated during the initial blowing step was measured. As a result, the water content at the time at which BV=10.5 was 800 ppm by mass, and the water content at the time at which BV=13 was 400 ppm by mass. In addition, the change in the water amount within the initial blow effluent is shown in FIG. 9.

Example 2

The ion exchange resin filling step was performed in the same manner as Example 1 to prepare an ion exchange resin-filled cartridge B.

<Water Content Reduction Step>

Thereafter, the ion exchange resin-filled cartridge B was supplied with nitrogen gas (purity: 99.99% or more) at a temperature of 50° C. at a flow rate of 10 L/hour for 120 minutes, and the nitrogen gas is allowed to pass inside the ion exchange resin-filled cartridge B so as to reduce the water content of the ion exchange resin to obtain an ion exchange resin-filled cartridge E filled with the ion exchange resin after water content reduction.

<Calculation of Water Content Reduction>

Thereafter, supply of nitrogen gas was stopped, the ion exchange resin in the ion exchange resin-filled cartridge E was taken out, and the water content thereof was measured. As a result, the water content was 56%. Consequently, the water content (A) of the ion exchange resin after water content reduction was calculated as 92% of the water content (B) of the ion exchange resin in its saturated equilibrium state.

Initial Blowing Test

The ion exchange resin filling step and the water content reduction step were performed in the same manner as described above to prepare an ion exchange resin-filled cartridge E.

<Initial Blowing Step>

A metal removing column was assembled by installing the ion exchange resin-filled cartridge E in a PFA demetallizing filter housing manufactured by Pall Corporation.

Thereafter, the initial blowing step was performed by supplying, as a liquid to be treated, isopropyl alcohol (SE grade, water content: 50 ppm by mass or less) to the metal removing column at $SV=4\ h^{-1}$, and continuously supplying the liquid to be treated, isopropyl alcohol, until the bed volume (BV) became 30. A change in the water amount within the initial blow effluent generated during the initial blowing step was measured. As a result, the water content at the time at which BV=10.5 was 800 ppm by mass, and the water content at the time at which BV=13.5 was 400 ppm by mass. In addition, the change in the water amount within the initial blow effluent is shown in FIG. 10.

<Purification Step>

The liquid to be treated, isopropyl alcohol, was continuously supplied to the metal removing column, isopropyl alcohol obtained as a treated liquid was collected at the time at which the bed volume (BV) was 18, and the water content thereof was measured. As a result, the water content of the isopropyl alcohol treated liquid was 190 ppm.

REFERENCE SIGNS LIST

1*a* granular macroporous type or porous type ion exchange resin in water-wet state
1*b* macroporous type or porous type ion exchange resin after water content reduction
1*c* macroporous type or porous type ion exchange resin after initial blowing
2 cylindrical part
3, 103 upper lid
4 lower lid
5 insertion pipe
6 O-ring
7 passage hole for liquid to be treated
8 passage hole for treated liquid
9 mesh
10 mesh
11 upper end side pipe diameter contracted part
12 lower end side pipe diameter contracted part
20*a*, 20*b*, 20*c*, 120 ion exchange resin-filled cartridge
21 housing container
22 supply port for liquid to be treated
23 treated liquid discharge pipe
24 inner wall of treated liquid discharge pipe
25 liquid transport pipe for treated liquid
26 liquid transport pipe for liquid to be treated
27 space between cylindrical part and housing container
28 connection pipe
29 inert gas
30 metal removing column
31 liquid to be treated
32 treated liquid
33*a* upper side cap member
33*b* lower side cap member
35 jig for inert gas introduction
40 ion exchange resin-filled cartridge with external air blocking member
51 groove for O-ring attachment
102 connection part
105 treated liquid discharge pipe
311 initial blow effluent
351 inert gas supply port

The invention claimed is:

1. A method for manufacturing an ion exchange resin-filled cartridge, comprising:
   filling a cartridge container with a macroporous or porous ion exchange resin before water content reduction to obtain an ion exchange resin-filled cartridge filled with the macroporous or porous ion exchange resin; and
   reducing a water content of the macroporous or porous ion exchange resin in the ion exchange resin-filled cartridge such that a water content, (A), of the macroporous or porous ion exchange resin after water content reduction becomes 90.0 to 97.0% of a water content, (B), of the macroporous or porous ion exchange resin in a saturated equilibrium state.

2. The method for manufacturing the ion exchange resin-filled cartridge according to claim 1, wherein the reducing of the water content is performed by allowing an inert gas to pass inside the cartridge container to bring the inert gas into contact with the macroporous type or porous ion exchange resin in the cartridge container.

3. The method for manufacturing the ion exchange resin-filled cartridge according to claim 2, wherein a temperature of the inert gas is 0 to 60° C.

4. The method for manufacturing the ion exchange resin-filled cartridge according to claim 1, wherein the reducing of the water content is performed by reducing a pressure within the cartridge container filled with the macroporous or porous-type ion exchange resin to vacuum drying the macroporous or porous ion exchange resin.

5. The method for manufacturing the ion exchange resin-filled cartridge according to claim 4, wherein a temperature at the vacuum drying is 0 to 60° C.

6. The method for manufacturing the ion exchange resin-filled cartridge according to claim 1, wherein the reducing of the water content is performed by heating the ion exchange resin-filled cartridge filled with the macroporous or porous ion exchange resin in a heating device under an inert gas atmosphere.

\* \* \* \* \*